G. WILLIAMSON.
BORING AND OTHER CUTTING TOOL.
APPLICATION FILED FEB. 21, 1921.

1,384,652.

Patented July 12, 1921.
2 SHEETS—SHEET 1.

Inventor
G. Williamson,
By Marks Clerk
Attys.

UNITED STATES PATENT OFFICE.

GEORGE WILLIAMSON, OF OLDHAM, ENGLAND.

BORING AND OTHER CUTTING TOOL.

1,384,652.   Specification of Letters Patent.   Patented July 12, 1921.

Application filed February 21, 1921. Serial No. 446,857.

*To all whom it may concern:*

Be it known that I, GEORGE WILLIAMSON, a subject of the King of Great Britain and Ireland, and resident of 251 Chamber road, Oldham, in the county of Lancaster, England, have invented certain new and useful Improvements relating to Boring and other Cutting Tools, (for which I have filed an application in Great Britain, No. 3,464, February 4, 1920,) of which the following is a specification.

This invention relates to boring and other cutting tools of the type wherein the cutters are mounted on a bar or carrier, rotated by the lathe or other machine, and adapted to be expanded or have feed or like adjustment movements imparted thereto relatively to the said bar or carrier.

The object of the invention is to provide an expanding boring or other tool of a compact and convenient form and comprises a self-contained cutter holder, independent of but adapted for ready attachment to a boring bar, a spindle or other part of the machine with which it is to be employed.

Referring to the two accompanying sheets of explanatory drawings:—

The same reference letters in the different views indicate the same or similar parts.

Figure 1:
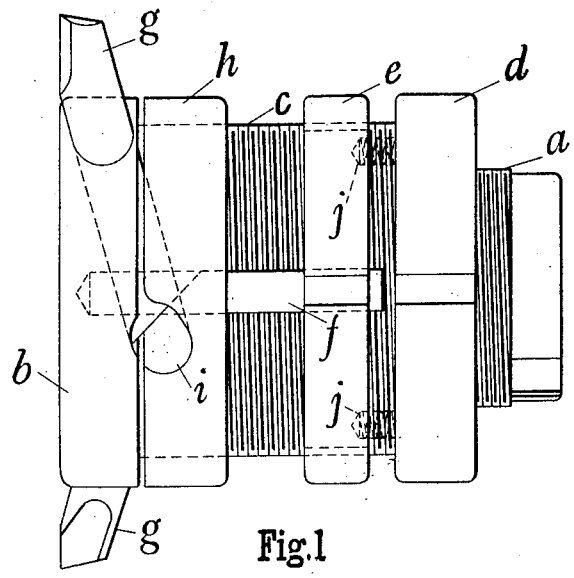
Figure 1 is a plan and Fig. 2 an end view of an expanding boring tool as constructed in one convenient manner in accordance with this invention.
Figure 2:
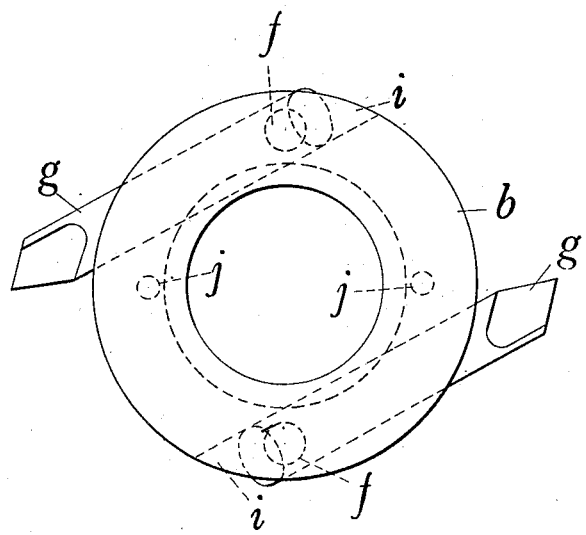
Figure 3:
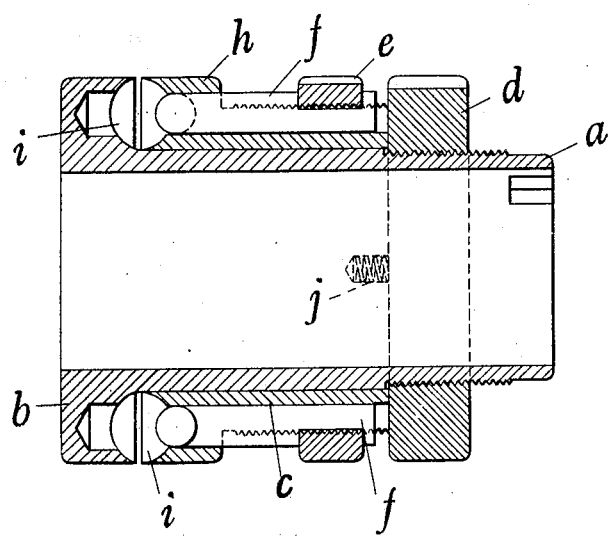
Fig. 3 is a sectional elevation and Fig. 4 a sectional end view of the tool with the cutters removed.
Figure 4:
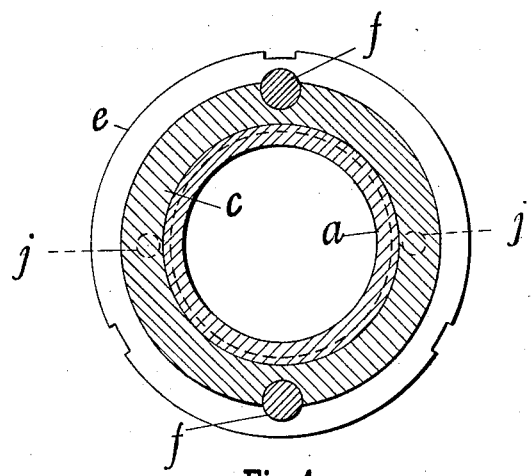

In the application of the invention, as illustrated by the drawings, the cutter holder comprises a tubular body part as $a$ having a head or flange $b$ at one end. On said body part is placed a sliding sleeve $c$ and also a screw-threaded collar or nut $d$ which serves to clamp the said sliding sleeve firmly against the said head or flange $b$ formed on the body part. The said sleeve $c$ carries a screw-threaded collar or nut $e$ adapted to engage and impart rectilinear movements to abutment pegs $f$ whereby the cutters $g$ have the expanding or feed movements imparted thereto. The said abutment pegs are disposed in grooves provided therefor in the sleeve $c$ and project through apertures in the head $h$ of the sleeve $c$.

The cutters $g$, of which preferably at least two are employed, are formed from short lengths of steel rods of circular or other section and are inserted in grooves $i$ formed tangentially across the adjacent surfaces of the heads $b$ and $h$ of the body part $a$ and sleeve $c$, respectively, the grooves being of such formation that on the tightening up of the screw collar or nut $d$ to clamp the sliding sleeve $c$ in position, the cutters are simultaneously gripped and held in position for service.

The outer ends of the cutters $g$ are suitably shaped to provide efficient cutting edge, while the inner ends are inclined or made wedge shape to correspond with the shape of the inner ends of the abutment pegs $f$. Thus when an inward rectilinear movement is given to the pegs by actuating the nut $e$, the cutters have an expanding or feeding movement imparted thereto.

The bore of the tubular body part $a$ of the cutter holder is made to suit the boring bar, the drill spindle or other like part of the machine with which it is to be employed, and it is secured to the said part by a set screw or otherwise.

The surface of the screwed collars or nuts $d$ and $e$ may be knurled to provide an effective hand gripping surface.

To prevent the cutters $g$ from falling away or becoming accidentally detached from the holder when the said collar $d$ is released to permit of adjustment of the cutters, springs as $j$ are disposed in end pockets or apertures in the sleeve $c$ and will exert sufficient pressure on the sleeve head $h$ to hold the cutters, while permitting of their adjustment by the action of the nut $e$ on pegs $f$ as aforesaid.

Having now described my invention, what I claim as new and desire to secure by Letters Patent is:—

1. In a tool of the type described, a body member, a member mounted for movement thereon, said body and movable members having normally alined cutter receiving portions, means mounted on the movable member for effecting adjustment of the cutter, and means for moving the movable member with respect to the body member to clamp the cutter in adjusted position, and also acting to prevent displacement of the cutter adjusting means.

2. In a tool of the type described, a body member, a member mounted for movement thereon, said body member and movable member having normally alined cutter receiving portions, means for effecting adjustment of the cutter, and means for moving the movable member with respect to the body member to clamp the cutter in adjusted position and also to prevent displacement of the cutter adjusting means.

3. In a tool of the type described, a body member, a member mounted for movement thereon, said body and movable members having normally alined cutter receiving portions, means for effecting adjustment of the cutter, means for moving the movable member with respect to the body member to clamp the cutter in adjusted position and also acting to prevent displacement of the cutter adjusting means, and means normally tending to actuate the movable member to prevent displacement of the cutter.

4. In a tool of the type described, a body member, a member movably mounted on the body member, means carried by the body and movable member responsive to relative movement of the latter to clamp a cutter engaged therewith, means to effect movement of the movable member with respect to the body member, and means mounted externally of the movable member and having threaded engagement therewith for adjusting a cutter and being held against displacement simultaneously with the clamping of the cutter.

5. In a tool of the type described, a body member, a member movably mounted on the body member, said body and movable members having cutter receiving portions normally disposed in alinement, means for moving the movable member with respect to the body member to clamp a cutter engaged therewith, cutter adjusting means having screw threaded engagement with the movable member and held against displacement coincident with the clamping of the cutter.

6. In a tool of the type described, a body member, a member movably mounted on the body member, said body and movable members having cutter receiving portions normally disposed in alinement, means for moving the movable member with respect to the body member to clamp a cutter engaged therewith, cutter adjusting means mounted upon the movable member and held against displacment coincident with the clamping of the cutter, and means normally tending to move the movable member with respect to the body member whereby to clamp the cutter.

In testimony whereof I have signed my name to this specification.

GEORGE WILLIAMSON